United States Patent
Qiao et al.

(10) Patent No.: US 10,893,423 B2
(45) Date of Patent: *Jan. 12, 2021

(54) LOAD MIGRATION METHOD, APPARATUS, AND SYSTEM

(71) Applicant: Huawei Technologies Co., Ltd., Shenzhen (CN)

(72) Inventors: Xiaoqiang Qiao, Shenzhen (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,390

(22) Filed: Feb. 10, 2020

(65) Prior Publication Data

US 2020/0187024 A1  Jun. 11, 2020

Related U.S. Application Data

(63) Continuation of application No. 16/233,858, filed on Dec. 27, 2018, now Pat. No. 10,602,381, which is a
(Continued)

(51) Int. Cl.
*H04W 24/02* (2009.01)
*H04W 28/08* (2009.01)
*H04W 8/14* (2009.01)

(52) U.S. Cl.
CPC ............. *H04W 24/02* (2013.01); *H04W 8/14* (2013.01); *H04W 28/08* (2013.01)

(58) Field of Classification Search
CPC ......... H04W 8/04; H04W 12/06; H04W 8/06; H04W 60/00; H04W 12/00514;
(Continued)

(56) References Cited

U.S. PATENT DOCUMENTS 8,891,485 B2  11/2014  Ohta et al.
10,602,381 B2 *  3/2020  Qiao .................... H04W 24/02
(Continued)

FOREIGN PATENT DOCUMENTS

CN  101686498 A  3/2010
CN  102014434 A  4/2011
(Continued)

OTHER PUBLICATIONS

"3rd Generation Partnership Project; Technical Specification Group Core Network and Terminals; Restoration procedures (Release 14)," 3GPP TS 23.007 V14.0.0, Jun. 2016, 96 pages.

*Primary Examiner* — Nimesh Patel
(74) *Attorney, Agent, or Firm* — Slater Matsil, LLP

(57) ABSTRACT

Embodiments of the present disclosure relate to the communications field, and provide a load migration method, apparatus, and system. The method includes: determining, by a source controller, a to-be-migrated UE that needs to be migrated to a destination controller; updating, by the source controller, resource information of the to-be-migrated UE in a database server, where the updated resource information includes a correspondence between the to-be-migrated UE and the destination controller; and sending, by the source controller, an inter-domain update instruction to an external network element, where the inter-domain update instruction includes an identifier of the to-be-migrated UE and an identifier of the destination controller.

16 Claims, 7 Drawing Sheets

Related U.S. Application Data continuation of application No. PCT/CN2016/087510, filed on Jun. 28, 2016.

(58) Field of Classification Search
CPC . H04W 8/183; H04W 8/26; H04W 12/00403; H04W 36/0016; H04W 8/186; H04W 12/0052; H04W 12/08; H04W 24/02; H04W 28/0273; H04W 88/08; H04W 8/20; H04W 28/0247; H04W 36/0033; H04W 48/06; H04W 76/15; H04W 88/182; H04W 8/02; H04W 92/04; H04W 92/045; H04W 28/02; H04W 28/0284; H04W 28/0289; H04W 28/12; H04W 28/18; H04W 36/0022; H04W 48/04; H04W 36/08; H04W 36/14; H04W 36/0083; H04W 36/0011; H04W 36/0005; H04W 8/08; H04W 36/0044; H04W 36/38; H04W 88/18; H04W 92/20; H04W 36/00837; H04W 36/0085; H04W 36/245; H04W 36/34; H04W 36/36; H04W 16/32; H04W 36/0077; H04W 36/26; H04W 72/04; H04W 84/042; H04W 84/12; H04W 12/10; H04W 28/06; H04W 36/0072; H04W 36/06; H04W 40/36; H04W 48/20; H04W 80/045; H04W 36/18; H04W 72/0486; H04W 72/087; H04W 88/14; H04W 36/0055; H04W 36/12; H04W 28/08; H04W 36/32; H04W 40/00; H04W 84/045; H04W 84/18; H04W 36/22; H04W 36/30; H04W 8/082; H04W 92/24; H04W 80/04; H04W 40/24; H04W 8/12; H04W 88/06; H04W 88/16; H04W 92/02; H04W 88/162; H04W 8/14; H04W 24/04; H04W 4/025; H04W 76/10; H04W 36/0094; H04W 76/27; H04W 88/04; H04W 92/14; H04W 16/18; H04W 28/0278; H04W 48/18; H04W 4/029; H04W 68/12; H04W 8/18; H04L 61/6054; H04L 61/1588; H04L 61/2076; H04L 63/0876; H04L 45/302; H04L 45/42; H04L 47/10; H04L 47/11; H04L 47/14; H04L 47/266; H04L 61/605; H04L 63/107; H04L 47/12; H04L 2001/0097; H04L 2209/08; H04L 5/0078; H04L 61/1511; H04L 9/0872; H04L 41/0803; H04L 5/0007; H04L 5/0053; H04L 67/28; H04L 12/1435; H04L 45/00; H04L 45/02; H04L 69/16; H04L 61/2015; H04L 63/0428; H04L 29/12915; H04L 61/6059; H04L 29/06027; H04L 65/103; H04L 12/66; H04L 63/0892; H04L 65/104; H04L 65/1083; H04L 45/125; H04L 65/1016; H04L 43/12; H04L 43/16; H04L 41/12; H04L 41/145; H04L 69/08; H04L 47/41; G06F 2009/4557; G06F 2009/45595; G06F 9/45558; G06F 9/5005; G06F 16/24573; G06F 16/245; G06F 16/252; G06F 16/9577; G06F 9/5088; H04M 15/8038; H04M 2215/204; H04M 2215/7442; H04M 15/58; H04M 3/2263; H04B 1/7113; H04B 1/7117; H04Q 3/0087; H04Q 3/0091; H04Q 2213/13531; Y02D 70/00; Y02D 70/1226; Y02D 70/1242; Y02D 70/1244; Y02D 70/1262; Y02D 70/1264; Y02D 70/142; Y02D 70/146; Y02D 70/164; Y02D 70/24; Y02D 70/25; Y02D 70/124; Y02D 70/22

See application file for complete search history.

(56) References Cited

U.S. PATENT DOCUMENTS

| | | |
|---|---|---|
| 2007/0086383 A1 | 4/2007 | Watanabe et al. |
| 2008/0049677 A1 | 2/2008 | Hayashi |
| 2008/0188223 A1 | 8/2008 | Vesterinen et al. |
| 2009/0082023 A1 | 3/2009 | Gustavsson |
| 2009/0168675 A1 | 7/2009 | Tao |
| 2009/0201878 A1 | 8/2009 | Kotecha et al. |
| 2010/0120434 A1 | 5/2010 | Hasegawa |
| 2010/0157897 A1 | 6/2010 | Yoon et al. |
| 2011/0063977 A1 | 3/2011 | Halfmann et al. |
| 2012/0282929 A1 | 11/2012 | Persson et al. |
| 2015/0230275 A1 | 8/2015 | Kerpez et al. |
| 2015/0319661 A1 | 11/2015 | Jung et al. |

FOREIGN PATENT DOCUMENTS

| | | |
|---|---|---|
| CN | 104769895 A | 7/2015 |
| EP | 2063660 A1 | 5/2009 |
| EP | 2107819 A1 | 10/2009 |

\* cited by examiner

LOAD MIGRATION METHOD, APPARATUS, AND SYSTEM

CROSS-REFERENCE TO RELATED APPLICATIONS

This application is a continuation of U.S. patent application Ser. No. 16/233,858, filed on Dec. 27, 2018, which is a continuation of International Application No. PCT/CN2016/087510, filed on Jun. 28, 2016. All of the afore-mentioned patent applications are hereby incorporated by reference herein in their entireties.

TECHNICAL FIELD

The present disclosure relates to the communications field, and in particular, to a load migration method, apparatus, and system.

BACKGROUND

In the 3rd Generation Partnership Project (3GPP) protocol, a Long Term Evolution (LTE) system includes an access network and a System Architecture Evolution (SAE) core network.

FIG. 1 is a schematic architectural diagram of an SAE core network in a control domain. An external network element 01, for example, an eNodeB (evolved NodeB), an AF (application function) entity, or a GW-U (Gateway User-plane), may interact with each controller 03 in the control domain by using a network element selector (NES) 02. Each controller 03 is connected to a database server 04. The database server 04 may be configured to store resource information such as subscription data and context data of all UEs (user equipment) in a current control domain. After receiving a user request initiated by UE and forwarded by the network element selector 02, the controller 03 may interact with the database server 04 to implement functions such as mobility management, session management, and charging and policy management. The network element selector 02 may select, based on a load status of each controller 03 and a preconfigured load balancing policy, a controller 03 having relatively low load to process the user request, to balance load of all controllers 03 in the current control domain and implement optimized utilization of resources in the current control domain.

However, when the load of all the controllers 03 is greater than a load threshold, the current control domain is overloaded. In this case, when any UE initiates a new user request, the network element selector 02 needs to wait for an idle controller 03 and then can allocate the controller 03 to the user request. This increases a communication delay between the UE and the SAE core network.

SUMMARY

Embodiments of the present disclosure provide a load migration method, apparatus, and system, so as to implement load migration across control domains, thereby reducing a communication delay generated due to overload of a current control domain, and realizing resource sharing and coordination across the control domains.

The following technical solutions are used in the embodiments of the present disclosure to achieve the foregoing objectives:

According to a first aspect, an embodiment of the present disclosure provides a load migration method, including the following. A source controller determines a to-be-migrated UE that needs to be migrated to a destination controller. A database server stores resource information such as subscription data and context data of the to-be-migrated UE. Each piece of data related to the to-be-migrated UE in the subscription data and the context data reflects a correspondence between the to-be-migrated UE and the source controller. Therefore, to migrate the to-be-migrated UE to the destination controller in a second control domain, the source controller may update the resource information of the to-be-migrated UE in the database server. In this case, the updated resource information includes a correspondence between the to-be-migrated UE and the destination controller. In addition, an external network element originally stores the correspondence between the to-be-migrated UE and the source controller. That is, after receiving a user request of the to-be-migrated UE, the external network element forwards the user request to the source controller based on the correspondence. Therefore, the source controller further needs to send an inter-domain update instruction to the external network element. The inter-domain update instruction includes an identifier of the to-be-migrated UE and an identifier of the destination controller, so that the external network element establishes the correspondence between the to-be-migrated UE and the destination controller. In this way, after the external network element receives the user request of the to-be-migrated UE subsequently, because the controller in the correspondence has been changed to the destination controller, the external network element can forward the user request to the destination controller based on the correspondence, so that the destination controller replaces the source controller to process the user request, to implement a load migration process across control domains, thereby reducing a communication delay generated due to overload of a current control domain.

In a possible design, the determining, by a source controller, to-be-migrated UE that needs to be migrated to a destination controller includes: receiving, by the source controller, a list of candidate controllers in the second control domain that is sent by a migration scheduler; receiving, by the source controller, a user request sent by first UE, where the source controller is a controller in a first control domain that receives the user request; then, determining, by the source controller, whether to use the first UE as the to-be-migrated UE; and determining, by the source controller, a candidate controller in the list of candidate controllers as the destination controller if determining that the first UE is used as the to-be-migrated UE.

That is, when load of the first control domain in which the source controller is located is relatively high, the source controller may actively perform load migration on the UE when the UE initiates the user request to the source controller, to implement a load migration process of single UE.

In a possible design, the determining, by the source controller, whether to use the first UE as the to-be-migrated UE includes: obtaining, by the source controller, at least one of: location information of the first UE, a priority of the user request, and a type of a service requested by the first UE; and determining, by the source controller based on at least one of: the obtained location information of the first UE, priority of the user request, and type of the service, whether to use the first UE as the to-be-migrated UE.

In a possible design, the determining, by a source controller, a to-be-migrated UE that needs to be migrated to a destination controller includes: sending, by the source controller to a migration scheduler, a quantity of candidate UEs that need to be migrated, so that the migration scheduler determines, in the second control domain, N destination controllers that can accept the candidate UEs, and determines a quantity of candidate UEs that can be accepted by each destination controller, where N is a natural number; receiving, by the source controller from the migration scheduler, identifiers of the N destination controllers and the quantity of candidate UEs that can be accepted by each destination controller; and determining, by the source controller in the candidate UEs for each destination controller, to-be-migrated UE corresponding to the destination controller.

In this way, when load of the first control domain is relatively high, the source controller in the first control domain may actively migrate the candidate UEs in batches to the second control domain having relatively low load, and the source controller may migrate a plurality of UEs to another control domain at a time, thereby quickly reducing load pressure of the source controller.

In a possible design, the updating, by the source controller, resource information of the to-be-migrated UE in a database server includes: searching, by the source controller, the database server for subscription data and context data of the to-be-migrated UE based on the identifier of the to-be-migrated UE; allocating, by the source controller, a new user identifier to the to-be-migrated UE; and updating, by the source controller in the subscription data and the context data, the identifier of the to-be-migrated UE to the new user identifier, and updating a stored identifier of the source controller to the identifier of the destination controller.

In a possible design, after the sending, by the source controller, an inter-domain update instruction to an external network element, the method further includes: allocating, by the source controller, a destination session index to be used in the second control domain to the to-be-migrated UE, where the destination session index is used to indicate a session identifier of a session between the to-be-migrated UE and the destination controller; and sending, by the source controller, a session index update instruction to the external network element, where the session index update instruction includes the destination session index, so that the external network element updates a session index of the to-be-migrated UE to the destination session index. In this way, subsequently, the to-be-migrated UE may interact with the destination controller in the second control domain by using the destination session index.

In a possible design, after the sending, by the source controller, an inter-domain update instruction to an external network element, the method further includes: sending, by the source controller, an NES update instruction to a destination NES, where the NES update instruction includes the identifier of the to-be-migrated UE and the identifier of the destination controller, so that the destination NES establishes the correspondence between the to-be-migrated UE and the destination controller.

In this way, when receiving the user request of the to-be-migrated UE subsequently, the external network element may first forward the user request to the destination NES. Then, the destination NES forwards the user request to the destination controller based on the correspondence between the to-be-migrated UE and the destination controller. Finally, the destination controller replaces the source controller to process the user request, thereby implementing the load migration process across the control domains.

According to a second aspect, an embodiment of the present disclosure provides a load migration method. The method includes obtaining, by a destination controller, a migration request sent by a source controller, where the migration request carries an identifier of a to-be-migrated UE, the source controller is a controller in a first control domain, and the destination controller is a controller in a second control domain. The method includes updating, by the destination controller based on the identifier of the to-be-migrated UE, resource information of the to-be-migrated UE in a database server, where the updated resource information includes a correspondence between the to-be-migrated UE and the destination controller. The method also includes sending, by the destination controller, an inter-domain update instruction to an external network element, where the inter-domain update instruction includes the identifier of the to-be-migrated UE and an identifier of the destination controller, so that the external network element establishes the correspondence between the to-be-migrated UE and the destination controller.

In a possible design, the load migration system further includes a migration scheduler connected to both the source controller and the destination controller; and the obtaining, by a destination controller, a migration request sent by a source controller includes: receiving, by the destination controller, a migration request forwarded by a migration scheduler, where the migration request carries a list of candidate UEs that need to be migrated in the first control domain, and the list of candidate UEs includes an identifier of each candidate UE; and determining, by the destination controller, the to-be-migrated UE in the list of candidate UEs.

According to a third aspect, an embodiment of the present disclosure provides a source controller. The source controller includes a determining unit, configured to determine a to-be-migrated user equipment UE that needs to be migrated to a destination controller, where the destination controller is a controller in a second control domain. The source controller also includes an update unit, configured to update resource information of the to-be-migrated UE in a database server, where the updated resource information includes a correspondence between the to-be-migrated UE and the destination controller, and the database server is connected to both the source controller and the destination controller. The source controller also includes a sending unit, configured to send an inter-domain update instruction to an external network element, where the inter-domain update instruction includes an identifier of the to-be-migrated UE and an identifier of the destination controller.

In a possible design, the source controller further includes an obtaining unit. The obtaining unit is configured to: receive a list of candidate controllers in the second control domain that is sent by a migration scheduler; and receive a user request sent by first UE, where the source controller is a controller in the first control domain that receives the user request. The determining unit is specifically configured to: determine whether to use the first UE as the to-be-migrated UE if the user request of the first UE is received; and determine a candidate controller in the list of candidate controllers as the destination controller if determining that the first UE is used as the to-be-migrated UE.

In a possible design, the obtaining unit is further configured to obtain at least one of: location information of the first UE, a priority of the user request, and a type of a service requested by the first UE. The determining unit is specifically configured to determine, based on at least one of: the obtained location information of the first UE, priority of the user request, and type of the service, whether to use the first UE as the to-be-migrated UE.

In a possible design, the sending unit is further configured to send, to a migration scheduler, a quantity of candidate UEs that need to be migrated, so that the migration scheduler determines, in the second control domain, N destination controllers that are allowed to accept the candidate UEs, and determines a quantity of candidate UEs that each destination controller is allowed to accept, where N is a natural number. The obtaining unit is configured to receive, from the migration scheduler, identifiers of the N destination controllers and the quantity of candidate UEs that each destination controller is allowed to accept. The determining unit is specifically configured to determine, in the candidate UEs for each destination controller, to-be-migrated UE that the destination controller is allowed to accept.

In a possible design, the update unit is specifically configured to: search the database server for subscription data and context data of the to-be-migrated UE based on the identifier of the to-be-migrated UE; reallocate a user identifier to the to-be-migrated UE; and update, in the subscription data and the context data, the identifier of the to-be-migrated UE to the reallocated user identifier, and update a stored identifier of the source controller to the identifier of the destination controller.

In a possible design, the source controller further includes an allocation unit, configured to allocate a destination session index to be used in the second control domain to the to-be-migrated UE, where the destination session index is used to indicate a session identifier of a session between the to-be-migrated UE and the destination controller. The sending unit is further configured to send a session index update instruction to the external network element, where the session index update instruction includes the destination session index.

In a possible design, the sending unit is further configured to send an NES update instruction to a destination NES, where the NES update instruction includes the identifier of the to-be-migrated UE and the identifier of the destination controller.

According to a fourth aspect, an embodiment of the present disclosure provides a destination controller. The destination controller includes an obtaining unit, configured to obtain a migration request sent by a source controller, where the migration request carries an identifier of a to-be-migrated user equipment UE, the source controller is a controller in a first control domain, and the destination controller is a controller in a second control domain. The destination controller also includes an update unit, configured to update resource information of the to-be-migrated UE in a database server based on the identifier of the to-be-migrated UE, where the updated resource information includes a correspondence between the to-be-migrated UE and the destination controller, and the database server is connected to both the source controller and the destination controller. The destination controller also includes a sending unit, configured to send an inter-domain update instruction to an external network element, where the inter-domain update instruction includes the identifier of the to-be-migrated UE and an identifier of the destination controller.

In a possible design, the destination controller further includes a determining unit. The obtaining unit is specifically configured to receive a migration request forwarded by a migration scheduler, where the migration request carries a list of candidate UEs that need to be migrated in the first control domain, and the list of candidate UEs includes an identifier of each candidate UE that needs to be migrated. The determining unit is configured to determine the to-be-migrated UE in the list of candidate UEs.

According to a fifth aspect, an embodiment of the present disclosure provides a source controller, including a processor, a memory, a bus, and a transceiver. The memory is configured to store a computer executable instruction, the processor is connected to the memory by using the bus, and when the source controller runs, the processor executes the computer executable instruction stored in the memory, to enable the source controller to perform the load migration method according to any design of the first aspect.

According to a sixth aspect, an embodiment of the present disclosure provides a destination controller, including a processor, a memory, a bus, and a transceiver. The memory is configured to store a computer executable instruction, the processor is connected to the memory by using the bus, and when the destination controller runs, the processor executes the computer executable instruction stored in the memory, to enable the destination controller to perform the load migration method according to any design of the second aspect.

According to a seventh aspect, an embodiment of the present disclosure provides a load migration system. The system includes the source controller according to any design of the third aspect, the destination controller according to any design of the fourth aspect, and a database server connected to both the source controller and the destination controller. The source controller is located in a first control domain, and the destination controller is located in a second control domain different from the first control domain.

In a possible design, the system further includes a migration scheduler connected to both the source controller and the destination controller.

In a possible design, the system further includes a source NES located in the first control domain and connected to the source controller, and a destination NES located in the second control domain and connected to the destination controller.

According to an eighth aspect, an embodiment of the present disclosure provides a computer storage medium, configured to store a computer software instruction used by the foregoing source controller. The computer storage medium includes a program designed for the source controller for executing the foregoing aspects.

According to a ninth aspect, an embodiment of the present disclosure provides a computer storage medium, configured to store a computer software instruction used by the foregoing destination controller. The computer storage medium includes a program designed for the destination controller for executing the foregoing aspects.

In the present disclosure, names of the source controller and the destination controller do not constitute a limitation to devices or functional modules. During actual implementation, the devices or the functional modules may exist with other names. Various devices or functional modules shall fall within the scope defined by claims of the present disclosure and their equivalent technologies, provided that functions of the various devices or functional modules are similar to functions of the devices or functional modules in the present disclosure.

In addition, for technical effects brought by any design manner of the second to the ninth aspects, refer to technical effects brought by different design manners of the first aspect, and details are not described herein again.

These or other aspects of the present disclosure are more concise and comprehensible in descriptions of the following embodiments.

BRIEF DESCRIPTION OF THE DRAWINGS

To describe the technical solutions in the embodiments of the present disclosure or in the prior art more clearly, the following briefly describes the accompanying drawings required for describing the embodiments or the prior art.

DETAILED DESCRIPTION OF ILLUSTRATIVE EMBODIMENTS

The following describes the technical solutions in the embodiments of the present disclosure with reference to the accompanying drawings in the embodiments of the present disclosure. Apparently, the described embodiments are merely some but not all of the embodiments of the present disclosure.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the present disclosure, "a plurality of" means two or at least two unless otherwise stated.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The embodiments of the present disclosure provide a load migration method, which may be applied to a load migration system 100 including a plurality of control domains. When a control domain in the plurality of control domains is overloaded, one or more UEs (which are referred to as to-be-migrated UE in the embodiments of the present disclosure) may be migrated to another control domain, and a controller in the another control domain processes a user request of the to-be-migrated UE, thereby reducing a communication delay generated due to overload of the current control domain, and realizing resource sharing and coordination across control domains.

Figure 1:
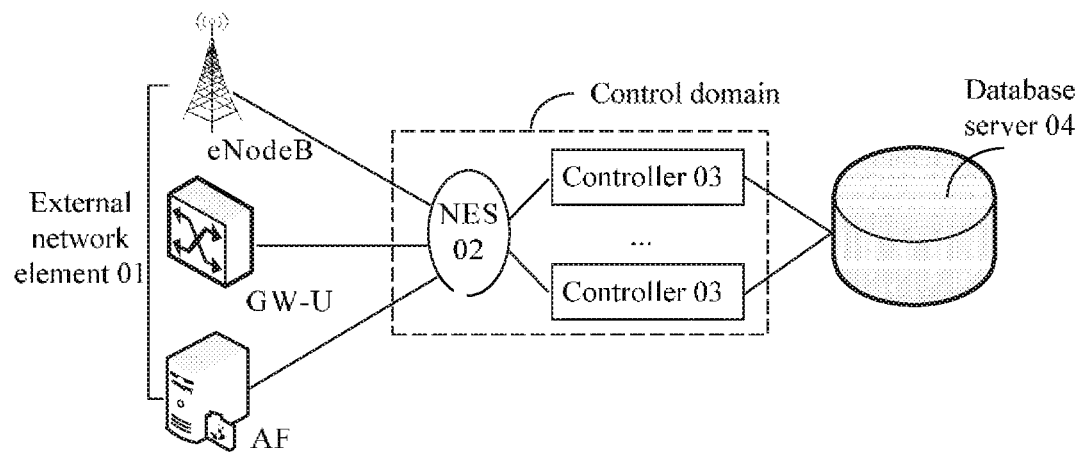
FIG. 1 is a schematic architectural diagram of an SAE core network in a control domain in the prior art.
Figure 2:
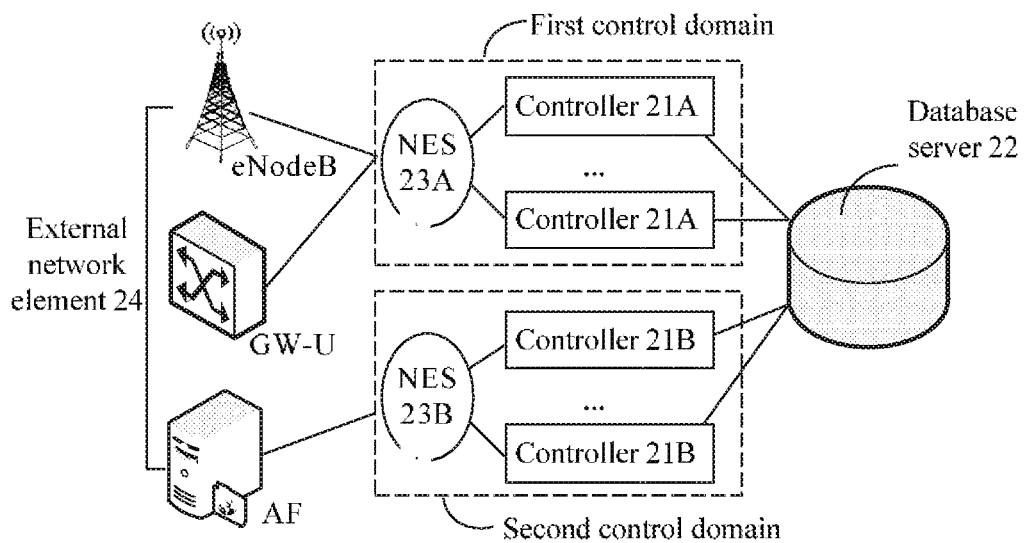
FIG. 2 is a first schematic architectural diagram of a load migration system according to an embodiment of the present disclosure.

FIG. 2 is a schematic architectural diagram of the foregoing load migration system 100. The load migration system 100 includes at least a first control domain and a second control domain. A plurality of controllers are disposed in each of the first control domain and the second control domain. For example, controllers 21A are disposed in the first control domain and controllers 21B are disposed in the second control domain. All of the controllers are connected to a database server (DB Server) 22. Optionally, one NES is disposed in each control domain, namely, an NES 23A is disposed in the first control domain and an NES 23B is disposed in the second control domain.

The NES is configured to forward, to a corresponding controller in a current control domain, a user request sent by an external network element 24. The controller may interact with the database server 22, to implement functions such as mobility management, session management, and charging and policy management that are requested in the user request. In addition, resource information such as subscription data and context data of UE that is stored in the database server 22 may be shared across control domains. The external network element 24 may be specifically a device such as an eNodeB, an AF, or a GW-U. This is not limited in the embodiments of the present disclosure.

It should be noted that in the load migration method provided in the embodiments of the present disclosure, a controller needing to perform load migration, for example, a controller in the first control domain, is referred to as a source controller, and a controller accepting the load migration, for example, a controller in the second control domain, is referred to as a destination controller. The source controller and the destination controller are located in different control domains.

Similarly, a network element selector connected to the source controller may be referred to as a source NES, and a network element selector connected to the destination controller may be referred to as a destination NES.

In this case, based on the load migration system boo, the embodiments of the present disclosure provide two load migration methods. In one load migration method, the source controller actively migrates a to-be-migrated UE in a control domain (for example, the first control domain in the embodiments of the present disclosure) in which the source controller is located to the destination controller in the second control domain. In the other load migration method, the destination controller actively migrates a to-be-migrated UE in a control domain in which the source controller is located to the destination controller. Both the two methods can implement load migration across control domains, thereby reducing a communication delay generated due to overload of a current control domain, and realizing resource sharing and coordination across the control domains.

In the embodiments of the present disclosure, the migrating the to-be-migrated UE of the source controller to the destination controller means that a function of controlling the to-be-migrated UE is migrated to the destination controller. Details are not described again in subsequent embodiments.

Figure 3:
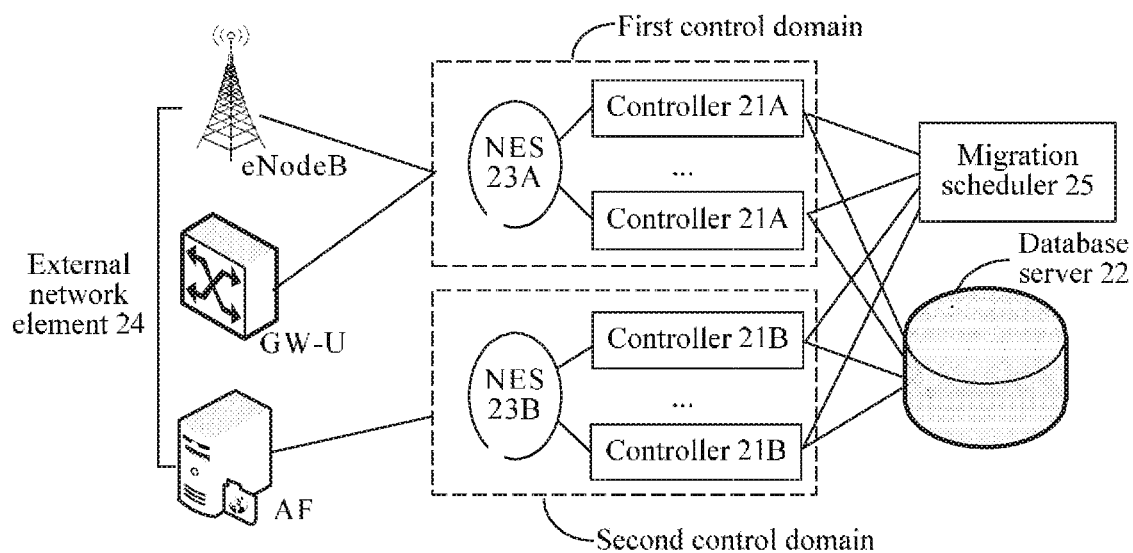
FIG. 3 is a second schematic architectural diagram of a load migration system according to an embodiment of the present disclosure.

Further, based on the load migration system 100 shown in FIG. 2, as shown in FIG. 3, a new network element, that is, a migration scheduler 25, is further introduced into the load migration system 100 provided in the embodiments of the present disclosure. The migration scheduler 25 is connected to each controller in each control domain.

Specifically, the migration scheduler 25 may be configured to monitor a load status of each controller in each control domain, to calculate a load value of each control domain, thereby implementing load scheduling across control domains based on load values of different control domains. For example, when a load value of the first control domain is relatively large and a load value of the second control domain is relatively small, the migration scheduler 25 may send a migration permission message to a source controller in the first control domain, to trigger the source controller in the first control domain to enable a load migration function. In addition, the migration scheduler 25 may further select an appropriate destination controller for the source controller, for example, select a controller having relatively low load in the second control domain as the destination controller, and the destination controller or the source controller migrates to-be-migrated UE to the destination controller.

It should be noted that the migration scheduler 25 may be integrated into any one of the foregoing devices in a form of a functional module, or may implement the foregoing functions in a form of an independent physical device. This is not limited in the embodiments of the present disclosure.

In the subsequent embodiments, the load migration method is described in detail with reference to the load migration system 100. Therefore, details are not described herein.

Figure 4:
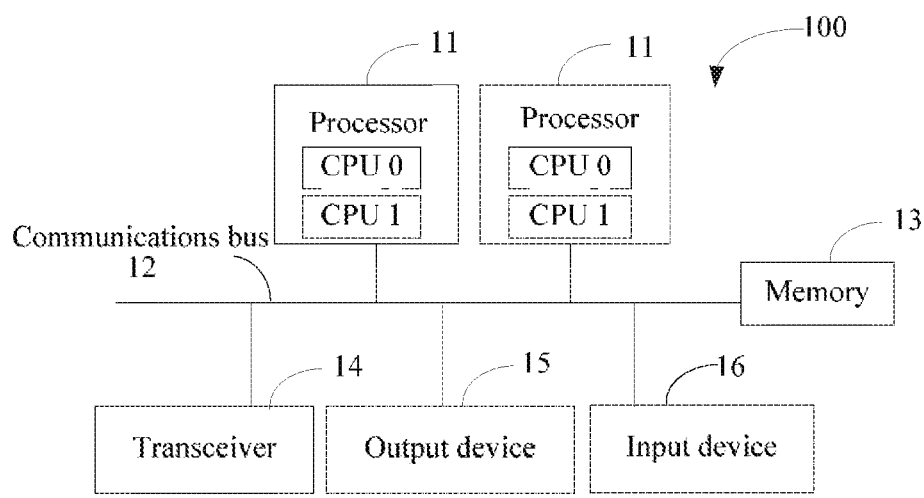
FIG. 4 is a schematic structural diagram of a computer device according to an embodiment of the present disclosure.

As shown in FIG. 4, the controller, the NES, or the migration scheduler 25 in FIG. 2 and FIG. 3 may be implemented by a computer device (or system) in FIG. 4.

FIG. 4 is a schematic diagram of a computer device 100 according to an embodiment of the present disclosure. The computer device 100 includes at least one processor 11, a communications bus 12, a memory 13, and at least one transceiver 14.

The processor 11 may be a general-purpose central processing unit (CPU), a microprocessor, an application-specific integrated circuit (ASIC), or one or more integrated circuits configured to control execution of a program in the solutions of the present disclosure.

The communications bus 12 may include a path for transmitting information between the foregoing components. The transceiver 14 is an apparatus using any type of transceiver, and is configured to communicate with another device or a communications network, such as the Ethernet, a radio access network (RAN), or a wireless local area network (WLAN).

The memory 13 may be a read-only memory (ROM) or another type of static storage device that can store static information and a static instruction, or a random access memory (RAM) or another type of dynamic storage device that can store information and an instruction; or may be an electrically erasable programmable read-only memory (EE-PROM), a compact disc read-only memory (CD-ROM) or another compact disc storage medium, optical disc storage medium (including a compact disc, a laser disc, an optical disc, a digital versatile disc, a Blu-ray disc, or the like) or magnetic disk storage medium, another magnetic storage device, or any other medium that can be configured to carry or store expected program code in a form of an instruction or a data structure and that is accessible by a computer, but is not limited thereto. The memory may independently exist and may be connected to the processor by using the communications bus. The memory may alternatively be integrated with the processor.

The memory 13 is configured to store application program code for executing the solutions of the present disclosure, and the processor 11 controls execution. The processor 11 is configured to execute the application program code stored in the memory 13.

During specific implementation, in an embodiment, the processor 11 may include one or more CPUs, for example, a CPU 0 and a CPU 1 in FIG. 4.

During specific implementation, in an embodiment, the computer device 100 may include a plurality of processors, for example, two processors 11 in FIG. 4. Each of these processors may be a single-core (single-CPU) processor, or may be a multi-core (multi-CPU) processor. Herein, the processor may be one or more devices, circuits, and/or processing cores configured to process data (for example, a computer program instruction).

During specific implementation, in an embodiment, the computer device 100 may further include an output device 15 and an input device 16. The output device 15 communicates with the processor 11, and may display information in various manners. For example, the output device 15 may be a liquid crystal display (LCD), a light emitting diode (LED) display device, a cathode ray tube (CRT) display device, a projector, or the like. The input device 16 communicates with the processor 11, and may receive an input of a user in various manners. For example, the input device 16 may be a mouse, a keyboard, a touchscreen device, a sensing device, or the like.

The computer device 100 may be a general-purpose computer device or a dedicated computer device. During specific implementation, the computer device 100 may be a desktop computer, a portable computer, a network server, a personal digital assistant (PDA), a mobile phone, a tablet computer, a wireless terminal device, a communications device, an embedded device, or a device having a structure similar to that in FIG. 4. In this embodiment of the present disclosure, a type of the computer device 100 is not limited.

It should be noted that in the embodiments of the present disclosure, any functional node, for example, the controller, the NES, or the migration scheduler 25, in the system may be implemented by a physical device, or may be implemented by a combination of a plurality of physical devices. A plurality of functional nodes in the system may be separately implemented by different physical devices, or may be implemented by a same physical device. It may be understood that any functional node in the system may be a logical functional module in a physical device, or may be a logical functional module including a plurality of physical devices.

Further, to clearly describe the load migration method provided in the present disclosure, descriptions are provided below all by using a logical functional module as an execution body. A person skilled in the art may understand that, during specific implementation, the logical functional module needs to depend on a hardware resource of a physical device in which the logical functional module is located.

In addition, in the embodiments of the present disclosure, the load migration system 100 may be applied to a 5G network or a Long Term Evolution (LTE) network, or may be applied to an LTE-Advanced communications network, for example, an LTE-A long term evolution advanced) system, and may further be applied to a 3rd Generation mobile communications (3G) network such as WCDMA. This is not limited in the present disclosure.

The load migration method provided in the embodiments of the present disclosure is described in detail below by using embodiments with reference to the load migration system 100 and different application scenarios.

Embodiment 1

Figure 5:
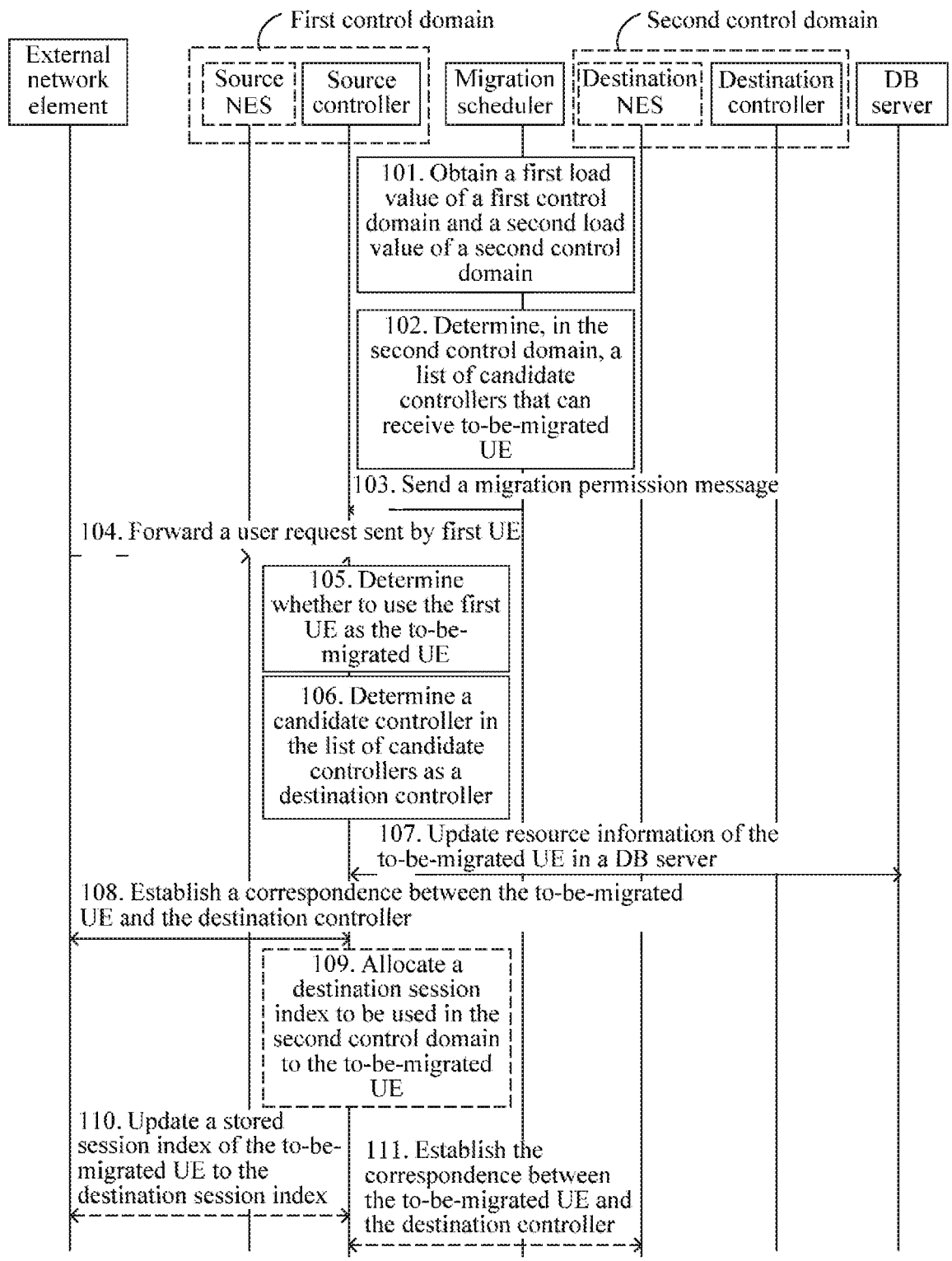
FIG. 5 is a first schematic interaction diagram of a load migration method according to an embodiment of the present disclosure.

This embodiment of the present disclosure provides a load migration method. When a UE initiates a user request to a source controller by using an external network element, the source controller may actively perform load migration on the UE. The source controller is located in a first control domain, a destination controller is located in a second control domain, and the first control domain and the second control domain are different control domains. As shown in FIG. 5, the load migration method includes the following steps.

101. A migration scheduler obtains a first load value of the first control domain and a second load value of the second control domain.

102. If the first load value is greater than a first load threshold, and the second load value is less than a second load threshold (where the first load threshold is greater than or equal to the second load threshold), the migration scheduler determines, in the second control domain, a list of candidate controllers that can accept a to-be-migrated UE.

103. The migration scheduler sends a migration permission message to the source controller, where the migration permission message carries the list of candidate controllers.

104. The external network element forwards, to a controller in the first control domain, a user request sent by a first UE, where the controller receiving the user request in the first control domain is the source controller.

105. The source controller determines whether to use the first UE as the to-be-migrated UE.

106. The source controller determines a candidate controller in the list of candidate controllers as the destination controller if determining that the first UE is used as the to-be-migrated UE.

107. The source controller updates resource information of the to-be-migrated UE in a DB server, where the updated resource information includes a correspondence between the to-be-migrated UE and the destination controller.

108. The source controller sends an inter-domain update instruction to the external network element, where the inter-domain update instruction includes an identifier of the to-be-migrated UE and an identifier of the destination controller.

In this way, in the load migration method provided in this embodiment of the present disclosure, when the UE initiates the user request to the source controller by using the external network element, the source controller may actively perform load migration on the UE. First, when the load value of the first control domain is relatively large, and the load value of the second control domain is relatively small, the source controller uses, as the to-be-migrated UE, a UE indicated by a newly received user request. To migrate the to-be-migrated UE to the destination controller in the second control domain, the source controller may update the resource information of the to-be-migrated UE in the DB server. The updated resource information includes the correspondence between the to-be-migrated UE and the destination controller. In addition, the source controller further needs to send the inter-domain update instruction to the external network element, so that the external network element establishes the correspondence between the to-be-migrated UE and the destination controller. In this way, after subsequently receiving the user request of the to-be-migrated UE, the external network element can forward the user request to the destination controller based on the correspondence, so that the destination controller replaces the source controller to process the user request, to implement a load migration process across control domains, thereby reducing a communication delay generated due to overload of a current control domain, and realizing resource sharing and coordination across the control domains.

For example, in step 101, because the migration scheduler may establish a data connection to each controller in each control domain, the migration scheduler can obtain a load value of each controller in each control domain. For example, ten controllers in the first control domain may periodically report current load values of the controllers to the migration scheduler. Alternatively, the migration scheduler may actively query a current load value of each controller separately from ten controllers in the first control domain. In this way, the migration scheduler can determine the first load value of the first control domain based on a load value of each controller in the first control domain.

For example, the migration scheduler may perform weighted averaging on load values of all controllers in the first control domain, to calculate the first load value of the first control domain.

Similarly, the migration scheduler may further determine the second load value of the second control domain based on a load value of each controller in the second control domain.

In step 102, the migration scheduler may compare an obtained load value of each control domain, to determine an overloaded control domain or some overloaded control domains (that is, determining a source control domain that needs to perform load migration), and determine whether a control domain (that is, a destination control domain) having relatively low load exists to replace the source control domain to process a user request or user requests that are of one or more UEs (that is, the to-be-migrated UE) and that originally need to be processed by the source control domain.

Specifically, if the first load value is greater than the first load threshold, and the second load value is less than the second load threshold, which indicates that the first control domain has relatively high load and needs to perform load migration, and the second control domain that can accept the load migration exists, the migration scheduler determines, in the second control domain, the list of candidate controllers that can receive the to-be-migrated UE.

For example, the migration scheduler may use X controllers in the second control domain that have smallest load values as candidate controllers, to obtain a list of candidate controllers including the X candidate controllers.

For example, the list of candidate controllers includes an identifier of the second control domain and an identifier of each candidate controller.

Then, in step 103, the migration scheduler may send the migration permission message to all controllers in the first control domain, that is, inform all the controllers in the first control domain that a load migration function can subsequently be performed.

The migration permission message carries the list of candidate controllers, so that a controller receiving the migration permission message determines a destination controller of the load migration.

Subsequently, when a UE, for example the first UE, that originally belongs to the first control domain sends a user request to the external network element, the external network element still stores a correspondence between the first UE and the first control domain in this case. Therefore, in step 104, the external network element still forwards the user request of the first UE to a controller, that is, the source controller, in the first control domain as in an existing interaction procedure.

Herein, a network element selector is disposed in each control domain, and the network element selector may be configured to forward, to a corresponding controller in the current control domain, each user request sent by the external network element. Therefore, the external network element may first send, to a network element selector in the first control domain, the user request sent by the first UE. Then, the network element selector forwards, based on a pre-stored correspondence between the first UE and a controller in the first control domain, the user request to the controller, that is, the source controller, indicated by the correspondence.

Then, in step 105, the source controller receiving the user request determines whether to use the first UE as the to-be-migrated UE.

For example, when a current load value of the source controller is greater than a load threshold, the first UE may be determined as the to-be-migrated UE.

Alternatively, to enable load migration to be performed more properly, the source controller may first obtain at least one of: location information of the first UE, a priority of the user request, and a service type in the user request. The location information of the first UE, the priority of the user request, or the service type in the user request may be carried in the user request. Then, the source controller determines, based on at least one of: the obtained location information of the first UE, priority of the user request, and service type in the user request, whether to use the first UE as the to-be-migrated UE.

For example, for a user request having a relatively high priority, when load migration is performed, a security risk and a communication delay of the user request may be increased. Therefore, when a priority of the user request of the first UE is relatively high, a subsequent load migration procedure is not triggered. When a priority of the user request of the first UE is relatively low, the first UE may be used as the to-be-migrated UE, and step 106 to step 108 may be performed.

In step 106, if determining that the first UE is used as the to-be-migrated UE, the source controller may determine, in the list of candidate controllers that is obtained in step 103, a candidate controller in the second control domain as the destination controller.

For example, the source controller may use a candidate controller having a lowest load in the list of candidate controllers as the destination controller. In this case, to prevent other controllers in the first control domain from selecting the same candidate controller as the destination controller, the source controller may send an occupation message to the other controllers in the first control domain. The occupation message includes an identifier of the candidate controller selected by the source controller, to avoid a load surge caused because the candidate controller accepts an excessively large quantity of to-be-migrated UEs.

Then, in step 107, because the DB server has stored the resource information such as subscription data and context data of the to-be-migrated UE, and each piece of data related to the to-be-migrated UE in the subscription data and the context data reflects a correspondence between the to-be-migrated UE and the source controller. Therefore, to migrate the to-be-migrated UE to the destination controller in the second control domain to implement load migration, the source controller may update the resource information of the to-be-migrated UE in the DB server.

For example, a temporary user identifier of the to-be-migrated UE is stored in the subscription data and the context data of the to-be-migrated UE, where the temporary user identifier includes an identifier of the source controller, for example, an MMEI (mobility management entity identifier) of the source controller. In this case, in step 107, the source controller may reallocate a new temporary user identifier to the to-be-migrated UE. Because the source controller has determined the destination controller that is to accept the to-be-migrated UE, the reallocated new temporary user identifier may carry the identifier of the destination controller. Then, the source controller replaces, in the DB server, the temporary user identifier already stored in the subscription data and the context data of the to-be-migrated UE with the new temporary user identifier, to establish the correspondence between the to-be-migrated UE and the destination controller in the subscription data and the context data of the to-be-migrated UE.

In addition, because the external network element originally stores the correspondence between the to-be-migrated UE and the source controller, after receiving the user request of the to-be-migrated UE, the external network element forwards the user request to the source controller based on the correspondence. Therefore, in step 108, to migrate the to-be-migrated UE to the destination controller in the second control domain to implement load migration, the source controller further needs to send the inter-domain update instruction to the external network element. The inter-domain update instruction includes the identifier of the to-be-migrated UE and the identifier of the destination controller, so that the external network element establishes the correspondence between the to-be-migrated UE and the destination controller according to the inter-domain update instruction.

Specifically, the source controller may send an S1-AP UE ID (that is, a UE identifier of an S1 interface) and the identifier of the destination controller to the external network element, and the external network element stores the S1-AP UE ID and the identifier of the destination controller in a storage unit of the external network element in a form of a list, to establish the correspondence between the to-be-migrated UE and the destination controller. Certainly, the external network element may further store an identifier of a network element selector (that is, a destination network element selector) in the second control domain in the foregoing list.

In this way, after the external network element receives the user request of the to-be-migrated UE subsequently, the correspondence between the to-be-migrated UE and the source controller has been changed to the correspondence between the to-be-migrated UE and the destination controller. Therefore, the external network element can forward the user request to the destination controller based on the foregoing changed correspondence, so that the destination controller replaces the source controller to process the user request, thereby implementing a load migration process across control domains.

Optionally, still as shown in FIG. 5, a session index needs to be used to identify an identity of UE when the UE has a session with a controller to which the UE belongs. For example, the session index may be a GUTI (globally unique temporary identity), an IP address, or the like. Therefore, when different session indexes are used in different control domains, step 109 further needs to be performed. That is, the source controller allocates a destination session index to be used in the second control domain to the to-be-migrated UE, in other words, allocates a new session index to the to-bemigrated UE. The destination session index is used to indicate a session identifier of a session between the to-be-migrated UE and the destination controller.

Then, in step 110, the source controller sends a session index update instruction to the external network element, where the session index update instruction carries the newly allocated destination session index, so that the external network element updates a stored session index of the to-be-migrated UE to the destination session index. In this way, subsequently, the to-be-migrated UE may interact with the destination controller in the second control domain by using the destination session index.

Herein, it should be noted that in step no, a process of instructing, by the source controller, the external network element to update the destination session index may be explicit or implicit. For example, the source controller may directly send the session index update instruction carrying the destination session index to the external network element, that is, explicitly instruct the external network element to update the session index of the to-be-migrated UE. Alternatively, in a normal process of interacting with the external network element, the source controller may add the destination session index to some response messages, for example, a TAU (Tracking Area Update) accept message, to implicitly trigger the process of updating the destination session index by the external network element.

In addition, if a network element selector (that is, the destination NES) is disposed in the second control domain, optionally, because the to-be-migrated UE does not belong to the second control domain before the load migration, the destination NES does not record the correspondence between the to-be-migrated UE and the destination controller. In this case, still as shown in FIG. 5, the source controller may further perform step 111. That is, the source controller sends an NES update instruction to the destination NES, where the NES update instruction also carries the identifier of the to-be-migrated UE and the identifier of the destination controller, so that the destination NES establishes the correspondence between the to-be-migrated UE and the destination controller.

In this way, when subsequently receiving the user request of the to-be-migrated UE, the external network element may first forward the user request to the destination NES. Then, the destination NES forwards the user request to the destination controller based on the correspondence between the to-be-migrated UE and the destination controller. Finally, the destination controller replaces the source controller to process the user request, thereby implementing the load migration process across the control domains.

Alternatively, when the user request forwarded by the external network element to the destination NES has carried the correspondence between the to-be-migrated UE and the destination controller, for example, the foregoing new temporary user identifier reallocated by the source controller to the to-be-migrated UE carries the identifier of the destination controller, step 111 does not need to be performed. The destination NES may directly forward the user request to the corresponding destination controller based on the correspondence between the to-be-migrated UE and the destination controller that is carried in the user request.

Further, by performing step 107 to step in, the source controller has migrated the first UE to the destination controller in the second control domain. In this case, the destination controller may process the user request of the first UE that is received by the external network element in step 104.

Certainly, subsequently, if determining that the load of the first control domain is lowered below a preset load migration threshold, the migration scheduler may further send a migration stop message to all the controllers in the first control domain. In this case, after receiving the user request subsequently, any controller in the first control domain does not trigger the load migration process in step 105 to step 111.

Steps performed by the source controller in step 101 to step 111 may be implemented by the source controller by executing the program instruction stored in the memory 13 and executed by the processor 11 in FIG. 4. Similarly, steps performed by the destination controller in step 101 to step 111 may be implemented by the destination controller by executing the program instruction stored in the memory 13 and executed by the processor 11 in FIG. 4.

Embodiment 2

Figure 6:
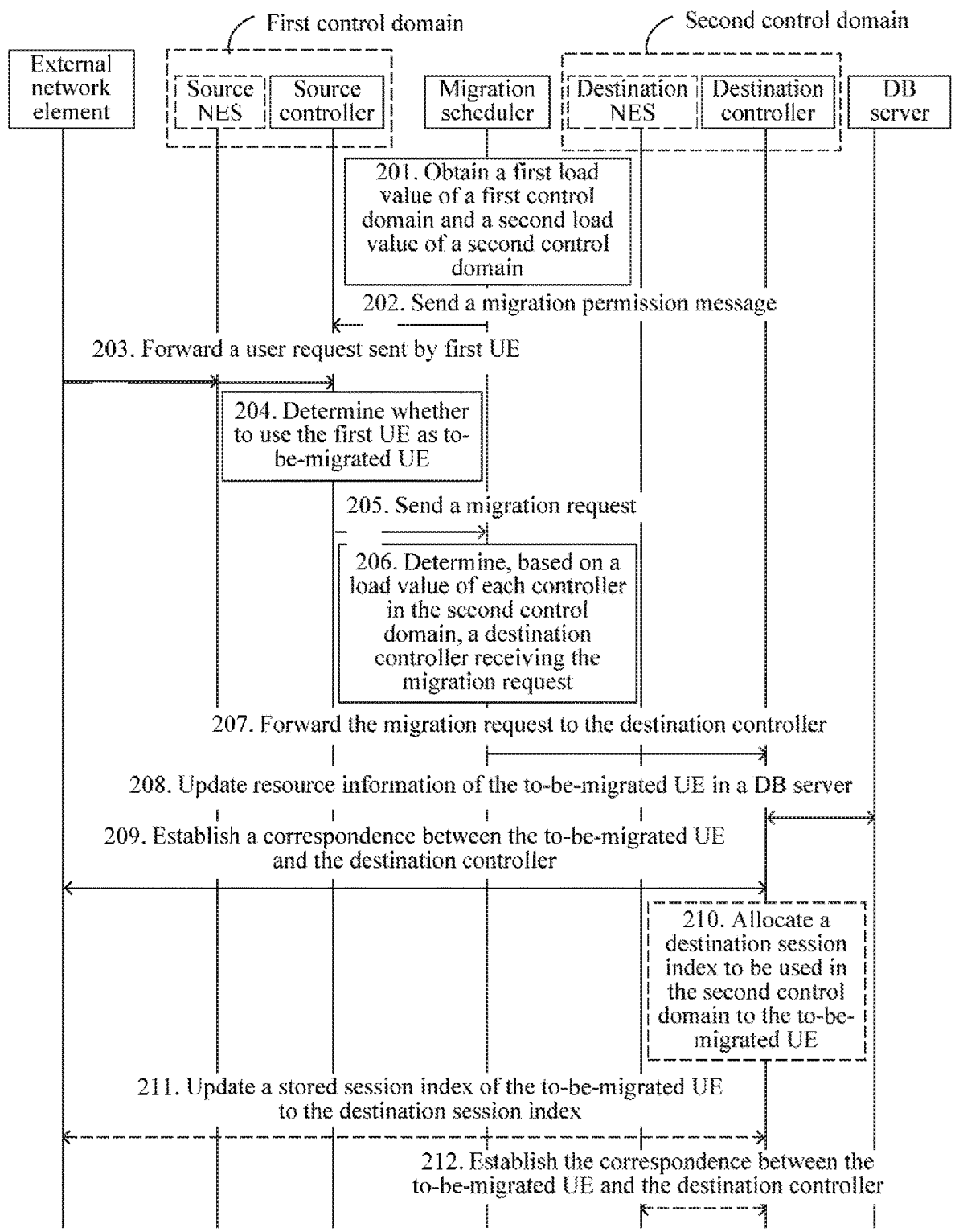
FIG. 6 is a second schematic interaction diagram of a load migration method according to an embodiment of the present disclosure.

This embodiment of the present disclosure provides a load migration method. When a UE initiates a user request to a source controller by using an external network element, a destination controller performs load migration on the UE. The source controller is located in a first control domain, and the destination controller is located in a second control domain different from the first control domain. As shown in FIG. 6, the load migration method includes the following steps.

201. A migration scheduler obtains a first load value of the first control domain and a second load value of the second control domain.

202. If the first load value is greater than a first load threshold, and the second load value is less than a second load threshold (where the first load threshold is greater than or equal to the second load threshold), the migration scheduler sends a migration permission message to a controller in the first control domain, where the migration permission message is used to indicate that the controller in the first control domain may migrate a to-be-migrated UE from the first control domain.

203. The external network element forwards, to a controller in the first control domain, a user request sent by a first UE, where the controller receiving the user request in the first control domain is the source controller.

204. The source controller determines whether to use the first UE as the to-be-migrated UE.

205. The source controller sends a migration request to the migration scheduler if determining that the first UE is used as the to-be-migrated UE, where the migration request carries an identifier of the to-be-migrated UE.

206. The migration scheduler determines, based on a load value of each controller in the second control domain, a destination controller receiving the migration request in the second control domain.

207. The migration scheduler forwards the migration request to the destination controller.

208. The destination controller updates resource information of the to-be-migrated UE in a DB server based on the identifier of the to-be-migrated UE, where the updated resource information includes a correspondence between the to-be-migrated UE and the destination controller.

209. The destination controller sends an inter-domain update instruction to the external network element, where the inter-domain update instruction includes the identifier of the to-be-migrated UE and an identifier of the destination controller.

In this way, in the load migration method provided in this embodiment of the present disclosure, when the UE initiates the user request to the source controller by using the external network element, a party accepting load migration, that is, the destination controller, may actively perform load migration on the UE. Specifically, when the load value of the first control domain is relatively large, and the load value of the second control domain is relatively small, the source controller adds the identifier of the to-be-migrated UE to the migration request and sends the migration request to the destination controller. Then, the destination controller may update the resource information of the to-be-migrated UE in the DB server. The updated resource information includes the correspondence between the to-be-migrated UE and the destination controller. In addition, the destination controller further needs to send the inter-domain update instruction to the external network element, so that the external network element establishes the correspondence between the to-be-migrated UE and the destination controller. In this way, after subsequently receiving the user request of the to-be-migrated UE, the external network element can forward the user request to the destination controller based on the correspondence, so that the destination controller replaces the source controller to process the user request, to implement a load migration process across control domains, thereby reducing a communication delay generated due to overload of a current control domain, and realizing resource sharing and coordination across the control domains.

For example, in step 201, the migration scheduler may determine the first load value of the first control domain and the second load value of the second control domain by using a monitored load value of each controller in each control domain. For a specific method for determining the first load value of the first control domain and the second load value of the second control domain, refer to step 101, and details are not described herein again.

In step 202, if the first load value is greater than the first load threshold, and the second load value is less than the second load threshold, which indicates that the first control domain has relatively high load and needs to perform load migration, and the second control domain that can accept the load migration exists, the migration scheduler may send the migration permission message to all controllers in the first control domain, that is, inform all the controllers in the first control domain that a load migration function can be performed subsequently.

Subsequently, when a UE, for example the first UE, that originally belongs to the first control domain sends a user request to the external network element, the external network element still stores a correspondence between the first UE and the first control domain in this case. Therefore, in step 203, the external network element still forwards the user request of the first UE to a controller, that is, the source controller, in the first control domain as in an existing interaction procedure.

Specifically, a network element selector, that is, a source NES, may be disposed in the first control domain. The external network element may first send, to the source NES, the user request sent by the first UE, and the source NES forwards the user request to a corresponding controller, that is, the source controller.

Then, in step 204, the source controller receiving the user request determines whether to use the first UE as the to-be-migrated UE. For the method, specifically refer to related descriptions in step 105, and details are not described herein again.

Further, in step 205, the source controller sends the migration request to the migration scheduler if determining that the first UE is used as the to-be-migrated UE. The migration request carries the identifier of the to-be-migrated UE, for example, an IMSI (international mobile subscriber identity) of the to-be-migrated UE.

After the migration scheduler receives the migration request, because the migration scheduler has obtained the load value of each controller in the second control domain having relatively low load in step 201, in step 206, the migration scheduler may select an appropriate destination controller for the source controller based on the load value of each controller in the second control domain.

For example, the second control domain is neighboring to the first control domain, and a controller A in the second control domain has a smallest load value. In this case, the migration scheduler may determine the controller A as the destination controller. Subsequently, the controller A in the second control domain replaces the source controller to process the user request of the to-be-migrated UE.

In this case, in step 207, the migration scheduler forwards, to the destination controller determined in step 206, the migration request sent by the source controller.

After receiving the migration request, in step 208, the destination controller updates the resource information of the to-be-migrated UE in the DB server based on the identifier of the to-be-migrated UE that is carried in the migration request. The updated resource information includes the correspondence between the to-be-migrated UE and the destination controller.

A method used by the destination controller to update the resource information of the to-be-migrated UE in the DB server is similar to the method used by the source controller to update the resource information of the to-be-migrated UE in the DB server in step 107. Therefore, details are not described herein again.

In addition, similar to step 108, in step 209, to migrate the to-be-migrated UE to the destination controller in the second control domain to implement load migration, the destination controller further needs to send the inter-domain update instruction to the external network element, where the inter-domain update instruction includes the identifier of the to-be-migrated UE and the identifier of the destination controller, so that the external network element receiving the inter-domain update instruction establishes the correspondence between the to-be-migrated UE and the destination controller.

In this way, after the external network element receives the user request of the to-be-migrated UE subsequently, a correspondence between the to-be-migrated UE and the source controller has been changed to the correspondence between the to-be-migrated UE and the destination controller. Therefore, the external network element can forward the user request to the destination controller based on the foregoing changed correspondence, so that the destination controller replaces the source controller to process the user request, thereby implementing a load migration process across control domains.

Optionally, similar to step 109 to step in, still as shown in FIG. 6, after step 209 is performed, the destination controller may further perform step 210 to step 212.

210. The destination controller allocates a destination session index to be used in the second control domain to the to-be-migrated UE, that is, allocates a new session index to the to-be-migrated UE.

211. The destination controller sends a session index update instruction to the external network element, where the session index update instruction carries the newly allocated destination session index, so that the external network element updates a stored session index of the to-be-migrated UE to the destination session index.

212. The destination controller sends an NES update instruction to a destination NES, where the NES update instruction also carries the identifier of the to-be-migrated UE and the identifier of the destination controller, so that the destination NES establishes the correspondence between the to-be-migrated UE and the destination controller.

In this way, by performing step 207 to step 212, the destination controller has migrated the to-be-migrated UE that originally belongs to the first control domain to the second control domain. Subsequently, the user request initiated by the to-be-migrated UE is to be processed by the destination controller in the second control domain. Different from Embodiment 1 in which the load migration process is performed by the source controller, the load migration process in step 207 to step 212 is performed by the destination controller. This is because a source controller needing to perform load migration usually has a very large load value. To prevent a further increase in a communication delay caused by a further increase in the load value of the source controller, the load migration process may be performed by a destination controller having a relatively small load value.

Steps performed by the source controller in step 201 to step 212 may be implemented by the source controller by executing the program instruction stored in the memory 13 and executed by the processor 11 in FIG. 4. Similarly, steps performed by the destination controller in step 201 to step 212 may be implemented by the destination controller by executing the program instruction stored in the memory 13 and executed by the processor 11 in FIG. 4.

Embodiment 3

Figure 7:
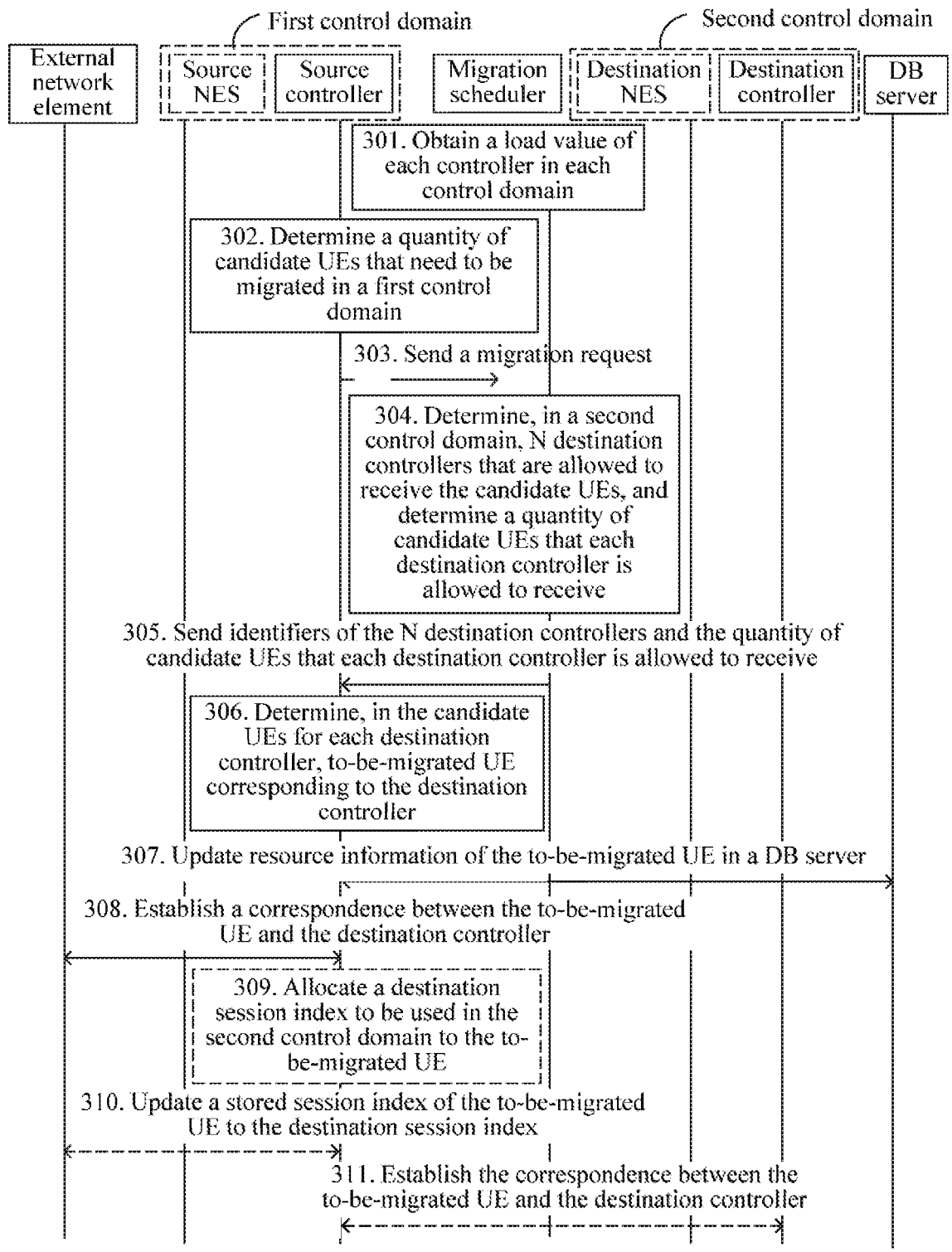
FIG. 7 is a third schematic interaction diagram of a load migration method according to an embodiment of the present disclosure.

This embodiment of the present disclosure provides a load migration method. When load of a first control domain is relatively high, a source controller in the first control domain may actively migrate a to-be-migrated UE (where the to-be-migrated UE includes one or more UEs) in batches to a second control domain having relatively low load. As shown in FIG. 7, the load migration method includes the following steps.

301. A migration scheduler obtains a load value of each controller in each control domain.

302. If a first load value of the first control domain is greater than a first load threshold, the source controller determines a quantity of candidate UEs that need to be migrated in the first control domain.

303. The source controller sends a migration request to the migration scheduler, where the migration request carries the quantity of candidate UEs.

304. The migration scheduler determines, in the second control domain based on a load value of each controller in the second control domain and the migration request, N (where N is a natural number) destination controllers that are allowed to accept the candidate UEs, and determines a quantity of candidate UEs that each destination controller is allowed to accept.

305. The migration scheduler sends, to the source controller, identifiers of the N destination controllers and the quantity of candidate UEs that each destination controller is allowed to accept.

306. The source controller determines, in the candidate UEs for each destination controller, the to-be-migrated UE corresponding to the destination controller.

307. The source controller updates resource information of the to-be-migrated UE in a DB server, where the updated resource information includes a correspondence between the to-be-migrated UE and the destination controller.

308. The source controller sends an inter-domain update instruction to the external network element, where the inter-domain update instruction includes an identifier of the to-be-migrated UE and an identifier of the destination controller.

In this way, in the load migration method provided in this embodiment of the present disclosure, when the load of the first control domain is relatively high, the source controller in the first control domain may actively migrate the to-be-migrated UE in batches to the second control domain having relatively low load. First, when the load value of the first control domain is relatively large, the source controller sends, to the migration scheduler, the migration request carrying a list of candidate UEs. The migration scheduler determines, for the source controller, the N candidate UEs (that is, the to-be-migrated UE) that can be migrated and the destination controller. Then, the source controller updates the resource information of the to-be-migrated UE in the DB server. The updated resource information reflects the correspondence between the to-be-migrated UE and the destination controller. In addition, the source controller further needs to send the inter-domain update instruction to the external network element. The inter-domain update instruction is used to instruct the external network element to establish the correspondence between the to-be-migrated UE and the destination controller. In this way, after receiving a user request of the to-be-migrated UE subsequently, the external network element can forward the user request to the destination controller based on the correspondence, so that the destination controller replaces the source controller to process the user request, to implement a load migration process across control domains, thereby reducing a communication delay generated due to overload of a current control domain, and realizing resource sharing and coordination across the control domains.

For example, in step 301, because the migration scheduler may establish a data connection to each controller in each control domain, the migration scheduler can obtain a load value of each controller in each control domain. That is, the migration scheduler may monitor a load status of each controller in each control domain in real time.

A controller or a network element selector in each control domain can obtain a load status of only the domain. Therefore, when the first load value of the first control domain is greater than the first load threshold, it indicates that the first control domain is overloaded. In this case, in step 302, any controller in the first control domain, for example, a controller having a largest load value, that is, the source controller, determines the quantity of candidate UEs that need to be migrated in the first control domain.

It may be understood that, a person skilled in the art may determine, based on actual experience or a particular algorithm, the candidate UEs that need to be migrated, for example, may use one or more UEs having a relatively high activity level as the candidate UEs.

Then, in step 303, the source controller adds the quantity of candidate UEs to the migration request, and sends the migration request to the migration scheduler.

Optionally, the source controller may further adds identifiers of the candidate UEs to the migration request, and sends the migration request to the migration scheduler.

In this case, in step 304, after receiving the migration request, the migration scheduler may calculate a load value of each other control domain than the first control domain based on the load value of each controller in each control domain. When a load value of a control domain, for example, the second control domain, is relatively small, N destination controllers that can accept the load migration in the second control domain and a quantity of candidate UEs that can be accepted by each destination controller may further be determined based on the load value of each controller in the second control domain.

For example, load values of a controller A and a controller B in the second control domain are relatively small. In this case, a quantity of candidate UEs that can be accepted by the controller A may be determined based on the load value of the controller A, and a quantity of candidate UEs that can be accepted by the controller B may be determined based on the load value of the controller B.

Then, in step 305, the migration scheduler sends, to the source controller, the identifiers of the N destination controllers and the quantity of candidate UEs that can be accepted by each destination controller.

It can be learned that, compared with Embodiment 1 and Embodiment 2 in which the migration scheduler actively sends the migration permission message to the source controller to enable the load migration process, in this embodiment, the migration scheduler may further receive the migration request actively sent by the source controller, to trigger the migration scheduler to allocate an appropriate destination controller to the source controller, to enable the load migration process.

In step 306, after receiving the identifiers of the N destination controllers, and the quantity of candidate UEs that can be accepted by each destination controller, the source controller determines, in the candidate UEs for each destination controller based on the quantity of candidate UEs that can be accepted by each destination controller, one or more to-be-migrated UEs corresponding to the destination controller, so that subsequently each to-be-migrated UE is migrated to a corresponding destination controller in the second control domain.

It can be learned that the process of determining the to-be-migrated UE in step 301 to step 306 does not need to be performed as in Embodiment 1 or Embodiment 2 in which when the UE initiates the user request to the source controller, whether each UE sending the user request is to-be-migrated UE is determined and the load migration is performed on each to-be-migrated UE. In this embodiment, the source controller may actively determine the to-be-migrated UE requiring load migration. In this way, there may be a plurality of to-be-migrated UEs. In this case, the source controller may migrate the plurality of UEs to another control domain at a time, thereby quickly reducing load pressure of the source controller.

Further, similar to step 107, in step 307, the source controller updates the resource information of the to-be-migrated UE in the DB server. The updated resource information includes the correspondence between the to-be-migrated UE and the destination controller.

In addition, similar to step 108, in step 308, the source controller sends the inter-domain update instruction to the external network element, where the inter-domain update instruction includes the identifier of the to-be-migrated UE and the identifier of the destination controller, so that the external network element establishes the correspondence between the to-be-migrated UE and the destination controller.

Optionally, similar to step 109 to step in, still as shown in FIG. 7, after step 308 is performed, the source controller may further perform step 309 to step 311.

309. The source controller allocates a destination session index to be used in the second control domain to the to-be-migrated UE.

310. The source controller sends a session index update instruction to the external network element, where the session index update instruction carries the newly allocated destination session index, so that the external network element updates a stored session index of the to-be-migrated UE to the destination session index.

311. The source controller sends an NES update instruction to a destination NES, where the NES update instruction also carries the identifier of the to-be-migrated UE and the identifier of the destination controller, so that the destination NES establishes the correspondence between the to-be-migrated UE and the destination controller.

Steps performed by the source controller in step 301 to step 311 may be implemented by the source controller by executing the program instruction stored in the memory 13 and executed by the processor 11 in FIG. 4. Similarly, steps performed by the destination controller in step 301 to step 311 may be implemented by the destination controller by executing the program instruction stored in the memory 13 and executed by the processor 11 in FIG. 4.

Embodiment 4

Figure 8:
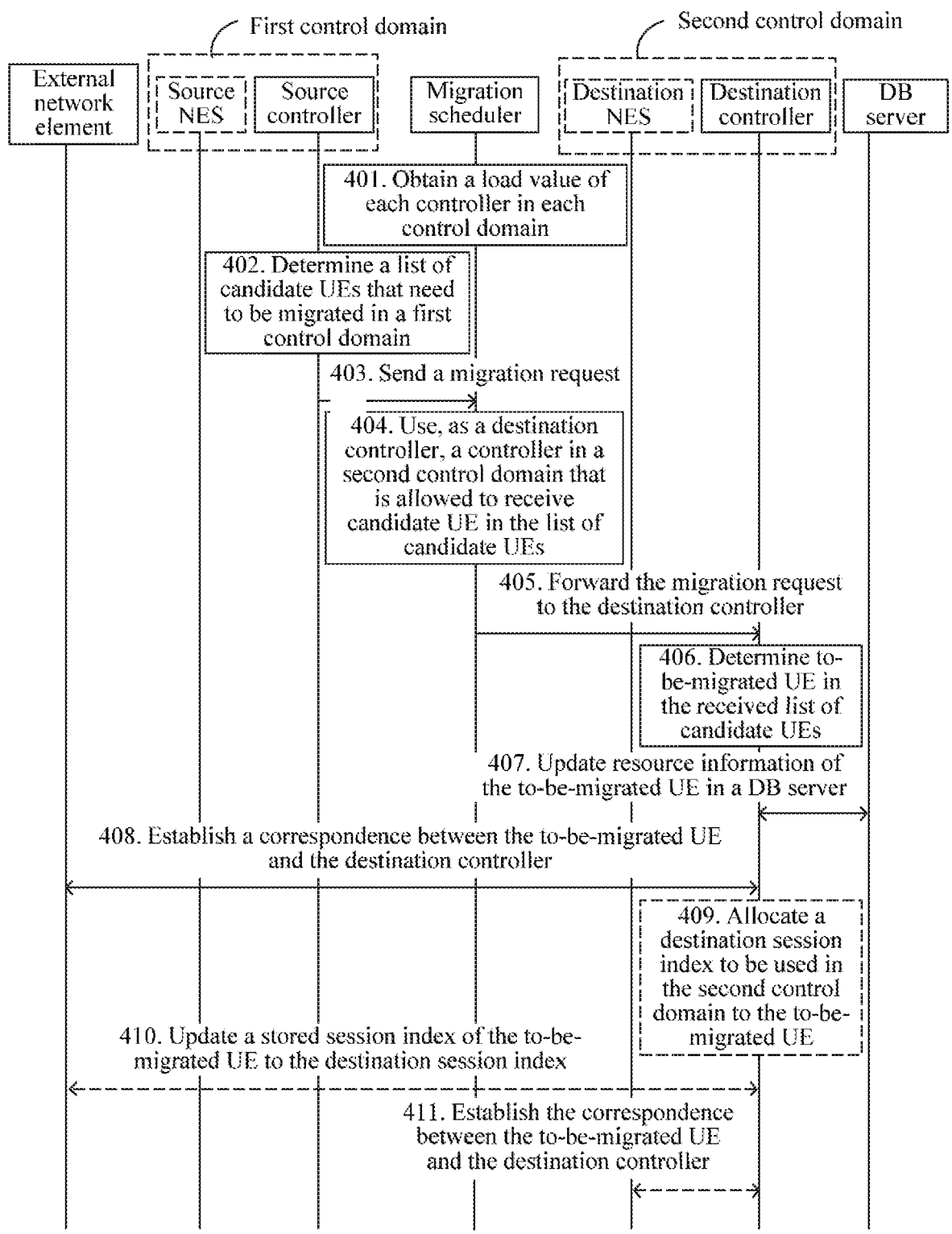
FIG. 8 is a fourth schematic interaction diagram of a load migration method according to an embodiment of the present disclosure.

This embodiment of the present disclosure provides a load migration method. When load of a first control domain is relatively high, a destination controller in a second control domain having relatively low load may migrate to-be-migrated UE (where the to-be-migrated UE includes at least one UE) in batches. As shown in FIG. 8, the load migration method includes the following steps.

401. A migration scheduler obtains a load value of each controller in each control domain.

402. If a first load value of the first control domain is greater than a first load threshold, a source controller determines a list of candidate UEs that need to be migrated in the first control domain.

403. The source controller sends a migration request to the migration scheduler, where the migration request includes the list of candidate UEs.

404. If a second load value of the second control domain is less than a second load threshold, the migration scheduler uses, as the destination controller, a controller in the second control domain that is allowed to accept candidate UE in the list of candidate UEs.

405. The migration scheduler forwards the migration request to the destination controller, where the migration request carries the list of candidate UEs.

406. The destination controller determines to-be-migrated UE in the received list of candidate UEs.

407. The destination controller updates resource information of the to-be-migrated UE in a DB server based on an identifier of the to-be-migrated UE, where the updated resource information includes a correspondence between the to-be-migrated UE and the destination controller.

408. The destination controller sends an inter-domain update instruction to an external network element, where the inter-domain update instruction includes the identifier of the to-be-migrated UE and an identifier of the destination controller.

In this way, in the load migration method provided in this embodiment of the present disclosure, when the load of the first control domain is relatively high, the destination controller in the second control domain having relatively low load may actively migrate the to-be-migrated UE in batches to the second control domain. First, when the load value of the first control domain is relatively high, the source controller sends, to the migration scheduler, the migration request carrying the list of candidate UEs. After the migration scheduler forwards the migration request to the corresponding destination controller, the destination controller determines the to-be-migrated UE in the list of candidate UEs. Then, the destination controller updates the resource information of the to-be-migrated UE in the DB server. The updated resource information includes the correspondence between the to-be-migrated UE and the destination controller. In addition, the destination controller further needs to send the inter-domain update instruction to the external network element, so that the external network element establishes the correspondence between the to-be-migrated UE and the destination controller. In this way, after receiving a user request of the to-be-migrated UE subsequently, the external network element can forward the user request to the destination controller based on the correspondence, so that the destination controller replaces the source controller to process the user request, to implement a load migration process across control domains, thereby reducing a communication delay generated due to overload of a current control domain, and realizing resource sharing and coordination across the control domains.

Similar to step 301 to step 303, in step 401 to step 403, the migration scheduler obtains the load value of each controller in each control domain. If the first load value of the first control domain is greater than the first load threshold, the source controller determines the list of candidate UEs that need to be migrated in the first control domain. Then, the source controller sends the migration request to the migration scheduler, where the migration request includes the list of candidate UEs.

In this case, in step 404, after receiving the migration request, the migration scheduler may calculate a load value of each other control domain than the first control domain based on the load value of each controller in each control domain. When a load value of a control domain (for example, the second control domain) is relatively small, a controller in the second control domain that can accept the candidate UE in the list of candidate UEs may further be determined as the destination controller based on the load value of each controller in the second control domain, that is, determining the destination controller that can receive the migration request.

Herein, the migration scheduler may determine a plurality of destination controllers.

Then, in step 405, the migration scheduler forwards the migration request to the determined destination controller. The migration request carries the list of candidate UEs. The list of candidate UEs may include an identifier of each candidate UE.

In this way, after receiving the migration request, the destination controller may determine the to-be-migrated UE in the received list of candidate UEs.

For example, the destination controller may select one or more UEs in the list of candidate UEs as the to-be-migrated UE based on a load value of the destination controller.

Then, similar to step 307 and step 308, in step 407 and step 408, the destination controller updates the resource information of the to-be-migrated UE in the DB server based on the identifier of the to-be-migrated UE. The updated resource information includes the correspondence between the to-be-migrated UE and the destination controller. In addition, the destination controller sends the inter-domain update instruction to the external network element, where the inter-domain update instruction includes the identifier of the to-be-migrated UE and the identifier of the destination controller, so that the external network element receiving the inter-domain update instruction establishes the correspondence between the to-be-migrated UE and the destination controller.

Optionally, similar to step 109 to step in, still as shown in FIG. 8, after step 408 is performed, the destination controller may further perform step 409 to step 411.

409. The destination controller allocates a destination session index to be used in the second control domain to the to-be-migrated UE.

410. The destination controller sends a session index update instruction to the external network element, where the session index update instruction carries the newly allocated destination session index, so that the external network element updates a stored session index of the to-be-migrated UE to the destination session index. 411. The destination controller sends an NES update instruction to a destination NES, where the NES update instruction also carries the identifier of the to-be-migrated UE and the identifier of the destination controller, so that the destination NES establishes the correspondence between the to-be-migrated UE and the destination controller.

Different from Embodiment 3 in which the load migration process is performed by the source controller, the load migration process in step 407 to step 411 is performed by the destination controller. This is because a source controller needing to perform load migration usually has a very large load value. To prevent a further increase in a communication delay caused by a further increase in the load value of the source controller, the load migration process may be performed by a destination controller having a relatively small load value.

Steps performed by the source controller in step 407 to step 411 may be implemented by the source controller by executing the program instruction stored in the memory 13 and executed by the processor 11 in FIG. 4. Similarly, steps performed by the destination controller in step 401 to step 411 may be implemented by the destination controller by executing the program instruction stored in the memory 13 and executed by the processor 11 in FIG. 4.

It can be learned from Embodiment 1 to Embodiment 4 that, the embodiments of the present disclosure provide two load migration methods.

In the load migration method 1, as shown in Embodiment 1 or Embodiment 3, the source controller actively migrates the to-be-migrated UE to the destination controller (where the source controller is located in the first control domain, and the destination controller is located in the second control domain).

First, the source controller may interact with the migration scheduler to determine the destination controller accepting the load migration. Then, the source controller determines the to-be-migrated UE that needs to be migrated to the destination controller. For example, when the load value of the first control domain is relatively large, and the load value the second control domain is relatively small, the source controller may use the UE indicated by the newly received user request as the to-be-migrated UE.

The DB server stores the resource information such as the subscription data and the context data of the to-be-migrated UE, and the subscription data and the context data reflect the correspondence between the to-be-migrated UE and the source controller. Therefore, to migrate the to-be-migrated UE to the destination controller in the second control domain, the source controller may update the resource information of the to-be-migrated UE in the DB server, to establish the correspondence between the to-be-migrated UE and the destination controller in the subscription data and the context data of the to-be-migrated UE.

In addition, the external network element originally stores the correspondence between the to-be-migrated UE and the source controller. After receiving the user request of the to-be-migrated UE, the external network element forwards the user request to the source controller based on the correspondence. Therefore, the source controller further needs to send the inter-domain update instruction to the external network element, where the inter-domain update instruction includes the identifier of the to-be-migrated UE and the identifier of the destination controller, so that the external network element establishes the correspondence between the to-be-migrated UE and the destination controller.

In this way, after the external network element receives the user request of the to-be-migrated UE subsequently, the controller in the correspondence has been changed to the destination controller. Therefore, the external network element can forward the user request to the destination controller based on the correspondence, so that the destination controller replaces the source controller to process the user request, thereby implementing the load migration process across the control domains.

In the load migration method 2, as shown in Embodiment 2 or Embodiment 4, when the load value of the first control domain is relatively large, and the load value of the second control domain is relatively small, the destination controller in the second control domain may migrate the to-be-migrated UE originally belonging to the first control domain to the second control domain.

First, when the load value of the first control domain is relatively large, and the load value of the second control domain is relatively small, the destination controller may obtain the migration request sent by the source controller. The migration request carries the identifier of the to-be-migrated UE.

Then, the destination controller updates the resource information of the to-be-migrated UE in the DB server based on the identifier of the to-be-migrated UE. The updated resource information includes the correspondence between the to-be-migrated UE and the destination controller.

In addition, the destination controller further needs to send the inter-domain update instruction to the external network element, where the inter-domain update instruction includes the identifier of the to-be-migrated UE and the identifier of the destination controller, so that the external network element establishes the correspondence between the to-be-migrated UE and the destination controller. In this way, after the external network element receives the user request of the to-be-migrated UE subsequently, the external network element can forward the user request to the destination controller based on the correspondence, so that the destination controller replaces the source controller to process the user request, thereby implementing the load migration process across the control domains.

Figure 9:
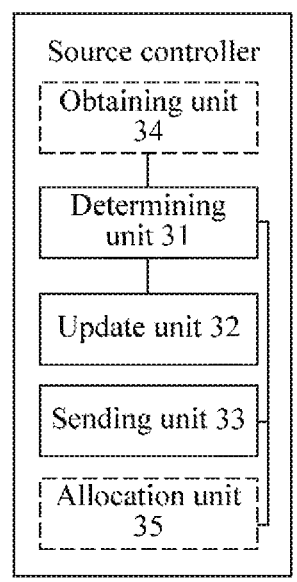
FIG. 9 is a schematic structural diagram of a source controller according to an embodiment of the present disclosure.

Further, FIG. 9 is a schematic structural diagram of a source controller according to an embodiment of the present disclosure. The source controller provided in this embodiment of the present disclosure may be configured to implement the methods implemented in the embodiments of the present disclosure shown in FIG. 2 to FIG. 8. For ease of description, only a part related to this embodiment of the present disclosure is shown. For specific technical details that are not disclosed, refer to the embodiments of the present disclosure shown in FIG. 2 to FIG. 8.

Specifically, the source controller includes: a determining unit 31, configured to determine to-be-migrated UE that needs to be migrated to a destination controller, where the destination controller is a controller in a second control domain; an update unit 32, configured to update resource information of the to-be-migrated UE in a database server, where the updated resource information includes a correspondence between the to-be-migrated UE and the destination controller, and the database server is connected to both the source controller and the destination controller; and a sending unit 33, configured to send an inter-domain update instruction to an external network element, where the inter-domain update instruction includes an identifier of the to-be-migrated UE and an identifier of the destination controller.

Further, still as shown in FIG. 9, the source controller further includes an obtaining unit 34.

The obtaining unit 34 is configured to: receive a list of candidate controllers in the second control domain that is sent by a migration scheduler; and receive a user request sent by first UE, where the source controller is a controller in the first control domain that receives the user request.

In this case, the determining unit 31 is specifically configured to: determine whether to use the first UE as the to-be-migrated UE if the user request of the first UE is received; and determine a candidate controller in the list of candidate controllers as the destination controller if determining that the first UE is used as the to-be-migrated UE.

Further, still as shown in FIG. 9, the obtaining unit 34 is further configured to obtain at least one of: location information of the first UE, a priority of the user request, and a type of a service requested by the first UE.

The determining unit 31 is specifically configured to determine, based on at least one of: the obtained location information of the first UE, priority of the user request, and type of the service, whether to use the first UE as the to-be-migrated UE.

Alternatively, still as shown in FIG. 9, the sending unit 33 is further configured to send, to a migration scheduler, a quantity of candidate UEs that need to be migrated, so that the migration scheduler determines, in the second control domain, N destination controllers that are allowed to accept the candidate UEs, and determines a quantity of candidate UEs that each destination controller is allowed to accept, where N is a natural number.

The obtaining unit 34 is configured to receive, from the migration scheduler, identifiers of the N destination controllers and the quantity of candidate UEs that each destination controller is allowed to accept.

The determining unit 31 is specifically configured to determine, in the candidate UEs for each destination controller, to-be-migrated UE that the destination controller is allowed to accept.

Further, the update unit 32 is specifically configured to: search the database server for subscription data and context data of the to-be-migrated UE based on the identifier of the to-be-migrated UE; reallocate a user identifier to the to-be-migrated UE; and update, in the subscription data and the context data, the identifier of the to-be-migrated UE to the reallocated user identifier, and update a stored identifier of the source controller to the identifier of the destination controller.

Further, still as shown in FIG. 9, the source controller further includes: an allocation unit 35, configured to allocate a destination session index to be used in the second control domain to the to-be-migrated UE, where the destination session index is used to indicate a session identifier of a session between the to-be-migrated UE and the destination controller.

In this case, the sending unit 34 is further configured to send a session index update instruction to the external network element, where the session index update instruction includes the destination session index.

Further, the sending unit 34 is further configured to send a network element selector NES update instruction to a destination NES, where the NES update instruction includes the identifier of the to-be-migrated UE and the identifier of the destination controller.

In this embodiment of the present disclosure, specific functions of the obtaining unit 34 and the sending unit 33 in the source controller may be implemented by the processor 11 in the computer device 100 shown in FIG. 4 by invoking the transceiver 14, and specific functions of the determining unit 31, the update unit 32, and the allocation unit 35 in the source controller may be implemented by the processor 11 in the computer device 100 in FIG. 4 by invoking the application program code stored in the memory 13 for performing the solutions of the present disclosure.

Figure 10:
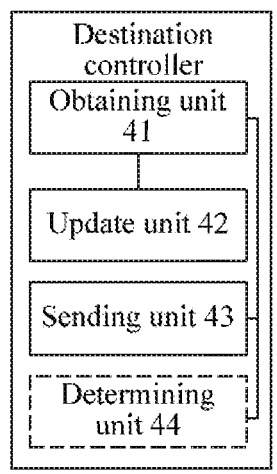
FIG. 10 is a schematic structural diagram of destination controller according to an embodiment of the present disclosure.

FIG. 10 is a schematic structural diagram of a destination controller according to an embodiment of the present disclosure. The destination controller provided in this embodiment of the present disclosure may be configured to implement the methods implemented in the embodiments of the present disclosure shown in FIG. 2 to FIG. 8. For ease of description, only a part related to this embodiment of the present disclosure is shown. For specific technical details that are not disclosed, refer to the embodiments of the present disclosure shown in FIG. 2 to FIG. 8.

Specifically, the destination controller includes: an obtaining unit 41, configured to obtain a migration request sent by a source controller, where the migration request carries an identifier of to-be-migrated UE, the source controller is a controller in a first control domain, and the destination controller is a controller in a second control domain; an update unit 42, configured to update resource information of the to-be-migrated UE in a database server based on the identifier of the to-be-migrated UE, where the updated resource information includes a correspondence between the to-be-migrated UE and the destination controller, and the database server is connected to both the source controller and the destination controller; and a sending unit 43, configured to send an inter-domain update instruction to an external network element, where the inter-domain update instruction includes the identifier of the to-be-migrated UE and an identifier of the destination controller.

Further, still as shown in FIG. 10, the destination controller further includes a determining unit 44.

The obtaining unit 41 is specifically configured to receive a migration request forwarded by a migration scheduler, where the migration request carries a list of candidate UEs that need to be migrated in the first control domain, and the list of candidate UEs includes an identifier of each candidate UE that needs to be migrated.

The determining unit 44 is configured to determine the to-be-migrated UE in the list of candidate UEs.

In this embodiment of the present disclosure, specific functions of the obtaining unit 41 and the sending unit 43 in the destination controller may be implemented by the processor 11 in the computer device 100 shown in FIG. 4 by invoking the transceiver 14, and specific functions of the determining unit 44 and the update unit 42 in the destination controller may be implemented by the processor 11 in the computer device 100 in FIG. 4 by invoking the application program code stored in the memory 13 for performing the solutions of the present disclosure.

In this way, in load migration apparatuses provided in this embodiment of the present disclosure, when the load of the first control domain is relatively high, the destination controller in the second control domain having relatively low load may actively migrate the to-be-migrated UE in batches to the second control domain. First, when the load value of the first control domain is relatively high, the source controller sends, to the migration scheduler, the migration request carrying the list of candidate UEs. After the migration scheduler forwards the migration request to the corresponding destination controller, the destination controller determines the to-be-migrated UE in the list of candidate UEs. Then, the destination controller updates the resource information of the to-be-migrated UE in the DB server. The updated resource information reflects the correspondence between the to-be-migrated UE and the destination controller. In addition, the destination controller further needs to send the inter-domain update instruction to the external network element, where the inter-domain update instruction is used to instruct the external network element to establish the correspondence between the to-be-migrated UE and the destination controller. In this way, after receiving the user request of the to-be-migrated UE subsequently, the external network element can forward the user request to the destination controller based on the correspondence, so that the destination controller replaces the source controller to process the user request, to implement a load migration process across control domains, thereby reducing a communication delay generated due to overload of a current control domain, and realizing resource sharing and coordination across the control domains.

It may be clearly understood by a person skilled in the art that, for the purpose of convenient and brief description, descriptions are made by using only division into the foregoing functional modules as an example. In actual application, the foregoing functions can be allocated to different functional modules for implementation depending on requirements. In other words, an inner structure of an apparatus is divided into different functional modules to implement all or some of the functions described above. For a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is only an example. For example, the module or unit division is only logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor to perform all or a part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for migrating a user equipment (UE) to a first controller from a second controller, comprising:
   obtaining, by a database server, a first temporary user identifier of the UE, the first temporary user identifier comprising an identifier of the second controller;
   obtaining, by the first controller, the first temporary user identifier of the UE;
   allocating, by the first controller, a second temporary user identifier to the UE, the second temporary user identifier comprising an identifier of the first controller;
   transmitting, by the first controller, the second temporary user identifier to the database server:
   replacing, by the database server, the first temporary user identifier by the second temporary user identifier, the database server being connected to both the first controller and the second controller; and
   sending, by the first controller to an external network element, the identifier of the first controller.

2. The method according to claim 1, further comprising: receiving, by the external network element, the identifier of the first controller.

3. The method according to claim 1, wherein replacing the first temporary user identifier comprises:
   searching, by the database server, context data of the UE based on the first temporary user identifier of the UE; and
   replacing, by the database server, the first temporary user identifier by the second temporary user identifier in the context data.

4. The method according to claim 1, wherein obtaining the first temporary user identifier comprises:
   receiving, by the first controller, a request from a migration scheduler, the request comprising the first temporary user identifier of the UE.

5. The method according to claim 4, wherein the migration scheduler is integrated in a base station.

6. The method according to claim 1, further comprising:
   determining, by a migration scheduler, the first controller; and
   informing, by the migration scheduler, the first controller of the first temporary user identifier of the UE.

7. The method according to claim 6, wherein the migration scheduler is integrated in a base station.

8. The method according to claim 1, wherein the first controller and the second controller are located in two different control domains.

9. A system for migrating a user equipment (UE) to a first controller from a second controller comprising:
   a database server connected to the first controller and the second controller, configured to:
      obtain a first temporary user identifier of the UE, the first temporary user identifier comprising an identifier of the second controller; and
      replace the first temporary user identifier by a second temporary user identifier; and
   the first controller, configured to:
      obtain the first temporary user identifier of the UE;
      allocate the second temporary user identifier to the UE, the second temporary user identifier comprising an identifier of the first controller;
      transmit the second temporary user identifier to the database server; and
      send, to an external network element, the identifier of the first controller.

10. The system according to claim 9, further comprising:
    the external network element, configured to receive the identifier of the first controller.

11. The system according to claim 9, wherein the database server is further configured to search context data of the UE based on the first temporary user identifier of the UE; and replace the first temporary user identifier by the second temporary user identifier in the context data.

12. The system according to claim 9, wherein the first controller is configured to receive a request from a migration scheduler, the request comprising the first temporary user identifier of the UE.

13. The system according to claim 12, wherein the migration scheduler is integrated in a base station.

14. The system according to claim 9, further comprising:
    a migration scheduler, configured to determine the first controller; and inform the first controller of the first temporary user identifier of the UE.

15. The system according to claim 14, wherein the migration scheduler is integrated in a base station.

16. The system according to claim 9, wherein the first controller and the second controller are located in two different control domains.

* * * * *